US007420876B2

(12) United States Patent
Sugiura

(10) Patent No.: US 7,420,876 B2
(45) Date of Patent: Sep. 2, 2008

(54) OBSTACLE SENSOR HAVING SUPERSONIC SENSOR

(75) Inventor: Makiko Sugiura, Hekinan (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/481,017

(22) Filed: Jul. 6, 2006

(65) Prior Publication Data

US 2008/0165620 A1    Jul. 10, 2008

(30) Foreign Application Priority Data

Jul. 20, 2005    (JP)    ............................. 2005-210127

(51) Int. Cl.
*G01S 15/93*    (2006.01)
*G01S 7/521*    (2006.01)

(52) U.S. Cl. .......................... 367/99; 367/87; 367/909; 73/649; 73/653

(58) Field of Classification Search .................. 367/87, 367/93, 99, 909; 73/649, 653
See application file for complete search history.

(56) References Cited

U.S. PATENT DOCUMENTS

| | | | | |
|---|---|---|---|---|
| 4,674,073 | A * | 6/1987 | Naruse | 367/909 |
| 5,161,125 | A * | 11/1992 | Maccabee | 367/99 |
| 6,055,042 | A * | 4/2000 | Sarangapani | 367/96 |
| 6,381,197 | B1 | 4/2002 | Savord et al. | |
| 6,515,614 | B2 * | 2/2003 | Sakai et al. | 342/70 |
| 6,542,085 | B1 * | 4/2003 | Yang | 367/99 |
| 2002/0185169 | A1 | 12/2002 | Hamamoto et al. | |
| 2006/0043843 | A1 | 3/2006 | Sugiura et al. | |

FOREIGN PATENT DOCUMENTS

| | | |
|---|---|---|
| DE | 19501612 | 7/1996 |
| JP | A-5-333148 | 12/1993 |
| JP | A-10-013981 | 1/1998 |
| JP | A-10-117341 | 5/1998 |
| JP | A-2001-016694 | 1/2001 |
| JP | A-2003-284182 | 10/2003 |
| JP | A-2004-026012 | 1/2004 |

OTHER PUBLICATIONS

Okuyama M. et al., "*Infrared and Ultrasonic sensors using Ferroelectric Thin Films,*" Transducers 03, The 12th International Conference on Solid State Sensors, Actuators and Microsystems, Boston, Jun. 8012, 2003, pp. 226-229.

Office Action dated Sep. 3, 2007 in corresponding german Patent Application No. 102006033693.3 (and English translation).

* cited by examiner

*Primary Examiner*—Ian J Lobo
(74) *Attorney, Agent, or Firm*—Posz Law Group, PLC

(57) ABSTRACT

An obstacle sensor includes: a supersonic sensor for detecting an obstacle in a first range, the supersonic sensor including a substrate, a transmission device and a reception device disposed on the substrate; a detection element for detecting the obstacle in a second range; and a case. The reception device includes multiple reception elements. At least a part of the first range of the supersonic sensor is different from the second range of the detection element. The supersonic sensor and the detection element are disposed in the case.

17 Claims, 10 Drawing Sheets

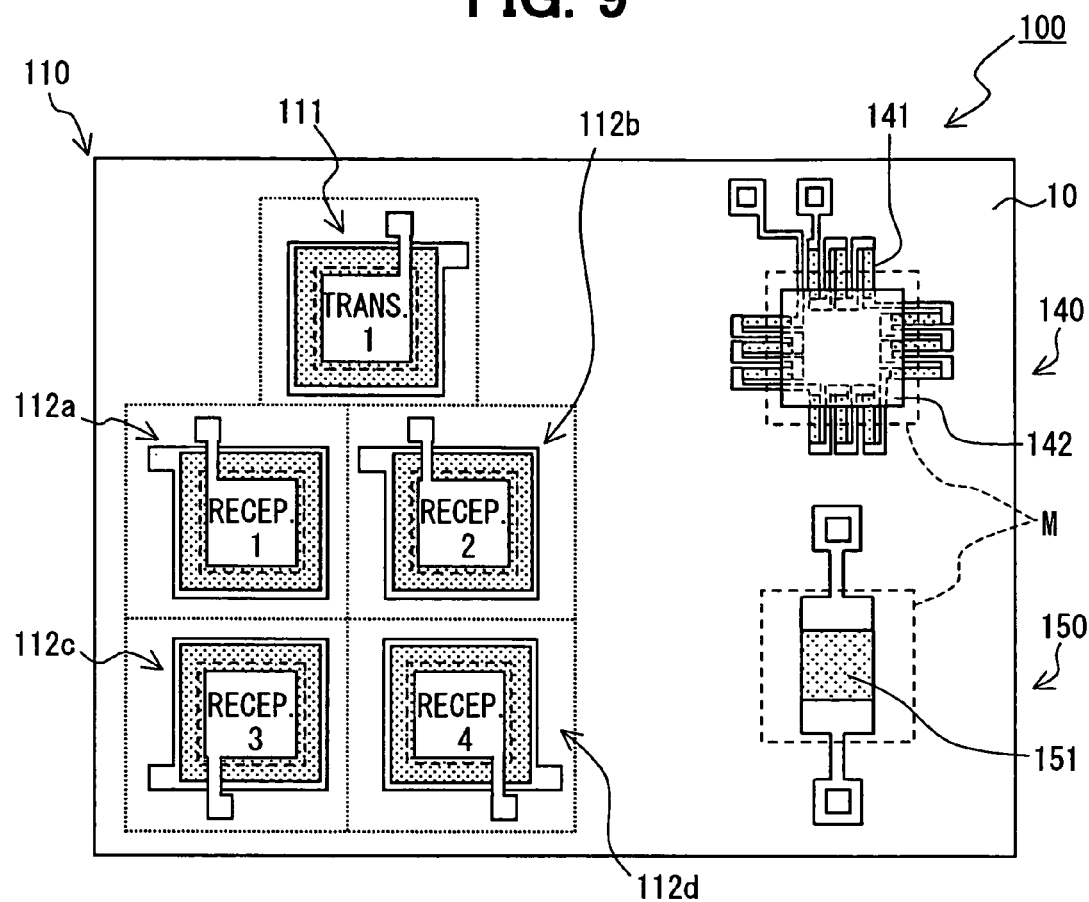
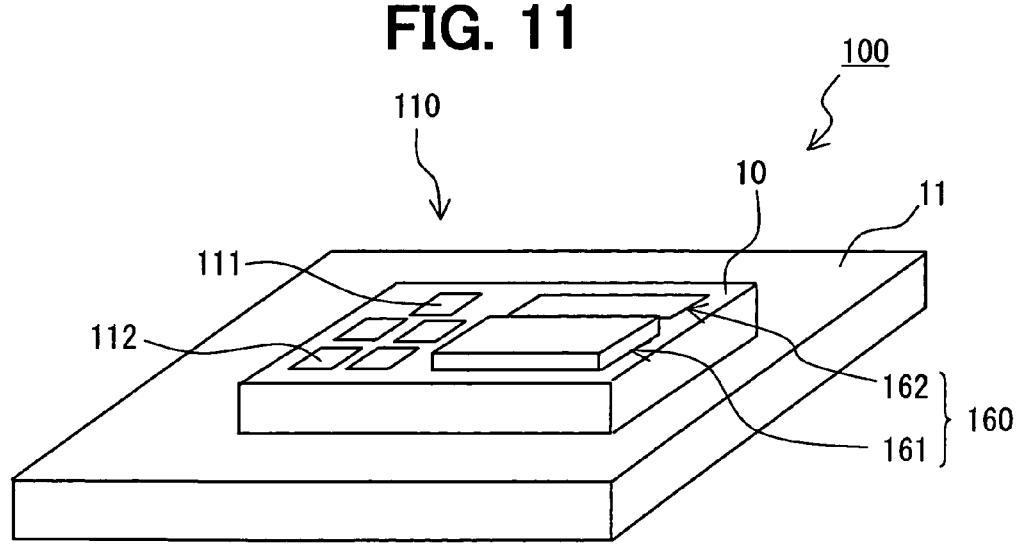

ature or humidity of air, and the temperature or humidity is different depending on ambient surrounding of the car, therefore there is a difficulty that detection accuracy of the obstacle is deteriorated by the effect of temperature change and humidity change. In particular, for temperature of the

OBSTACLE SENSOR HAVING SUPERSONIC SENSOR

CROSS REFERENCE TO RELATED APPLICATION

This application is based on Japanese Patent Application No. 2005-210127 filed on Jul. 20, 2005, the disclosure of which is incorporated herein by reference.

FIELD OF THE INVENTION

The present invention relates to an obstacle sensor having a supersonic sensor.

BACKGROUND OF THE INVENTION

For example, JP-A-2001-16694 discloses a supersonic sensor device that is mounted on a vehicle such as car, and used for obstacle detection and the like. The supersonic sensor device has a transmission element and a reception element (one element may be used both as transmission and reception elements), and transmits a supersonic wave from the transmission element, and receives a supersonic wave that was struck to an obstacle and reflected thereby. The device is used for performing arithmetic processing and thus detecting a direction or distance of the obstacle, or determining unevenness of the obstacle using sound pressure, time difference, and phase difference of the supersonic wave received by the reception element.

As the reception element used for such a supersonic sensor device, an element has been noticed, in which an oscillator formed of a piezoelectric thin film is formed on a membrane formed as a small thickness portion of a substrate. The reception element having a membrane structure is formed by a semiconductor micromachining technique, and hereinafter called MEMS (Micro Electro Mechanical System) type supersonic sensor element. Such a MEMS type supersonic sensor element and a supersonic array sensor device using the element are disclosed, for example, in JP-A-2003-284182. The supersonic sensor element (reception element) is formed by sandwiching a thin film layer of a PZT ceramic that is a ferroelectric substance by two electrodes, and includes a piezoelectric sensor that has a predetermined resonance frequency to detect a supersonic wave, wherein predetermined bias voltage is applied between the two electrodes during measuring operation of the supersonic sensor element, thereby the resonance frequency of the element can be changed.

However, in the above configuration, a supersonic sound source and a supersonic array sensor device are separately provided, and manufacturing cost is necessary for each of them. Moreover, when they are equipped on a bumper of a car and the like, mounting accuracy of the supersonic sound source and the supersonic array sensor device affects on detection accuracy of the direction or distance of the obstacle, and an equipping interval between them becomes large.

In a supersonic sensor device directly mounted on the bumper of the car, when a water drop or dust is adhered on a surface of the supersonic sensor element, a distance to the obstacle cannot be accurately measured. Furthermore, attenuation of a supersonic wave propagated in air depends on temperature or humidity of air, and the temperature or humidity is different depending on ambient surrounding of the car, therefore there is a difficulty that detection accuracy of the obstacle is deteriorated by the effect of temperature change and humidity change. In particular, for temperature of the ambient surrounding of the car, ambient temperature can be measured by an ambient temperature sensor and the like, however for humidity, there is not any appropriate humidity sensor, which can be mounted outside a vehicle interior, consequently the difficulty is not eliminated.

SUMMARY OF THE INVENTION

In view of the above-described problem, it is an object of the present disclosure to provide an obstacle detector having a supersonic sensor.

According to an aspect of the present disclosure, an obstacle sensor for detecting an obstacle includes: a supersonic sensor for detecting the obstacle in a first range, wherein the supersonic sensor includes a substrate, a transmission device for transmitting a supersonic wave by converting an electric signal, and a reception device for receiving the supersonic wave and for converting the supersonic wave to an electric signal, and wherein the transmission device and the reception device are disposed on the substrate; a detection element for detecting the obstacle in a second range; and a case. The reception device includes multiple reception elements. At least a part of the first range of the supersonic sensor is different from the second range of the detection element. The supersonic sensor and the detection element are disposed in the case.

In the above sensor, since the transmission device and the reception device are formed on the same substrate, the dimensions of the sensor is minimized, and further, the manufacturing cost of the sensor is reduced. Further, since the positional relationship between the transmission device and the reception device is accurately defined on the substrate, the detection accuracy of the sensor is not substantially influenced by the attachment factor such as attachment error even when the sensor is mounted on an automotive vehicle. Further, since the sensor includes two different types of the sensors, the obstacle sensor securely detects the obstacle, and detects the obstacle in a wider range. Thus, the sensor has a small size, a wide detection range, and a low manufacturing cost.

BRIEF DESCRIPTION OF THE DRAWINGS

The above and other objects, features and advantages of the present invention will become more apparent from the following detailed description made with reference to the accompanying drawings. In the drawings:

FIG. 9 is a plan view showing an obstacle sensor according to a second embodiment of the present invention;

FIG. 11 is a perspective view showing an obstacle sensor according to a third embodiment of the present invention;

DETAILED DESCRIPTION OF THE PREFERRED EMBODIMENTS

First Embodiment

An obstacle detector is set, for example, in a vehicle, and configured in a way of detecting an obstacle in the periphery of the vehicle.

The obstacle detector according to an embodiment has roughly two feature points. One is a point of disposing a supersonic sensor and a detection unit in the same housing, and the other is a configuration of the supersonic sensor. First, the former is described.

Figure 1A:
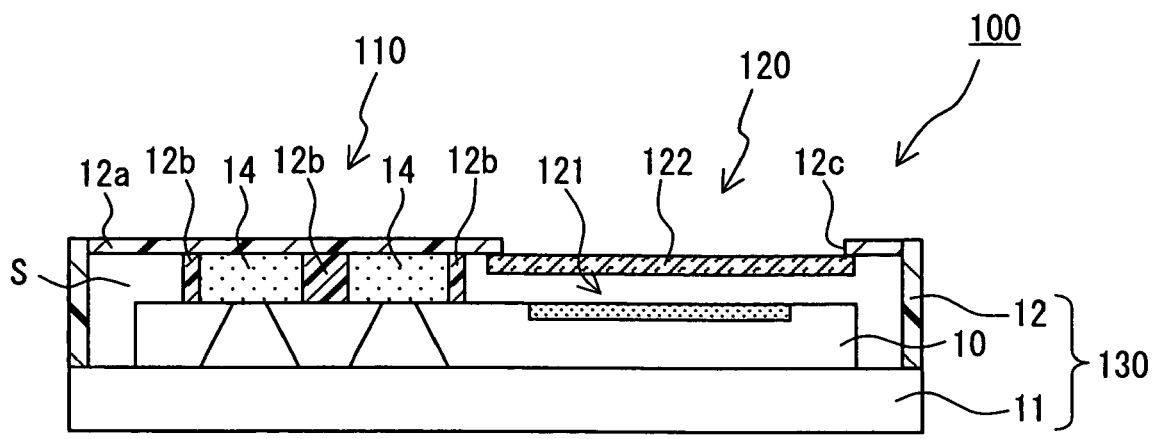
FIG. 1A is a cross sectional view showing an obstacle sensor according to a first embodiment of the present invention.
Figure 1B:
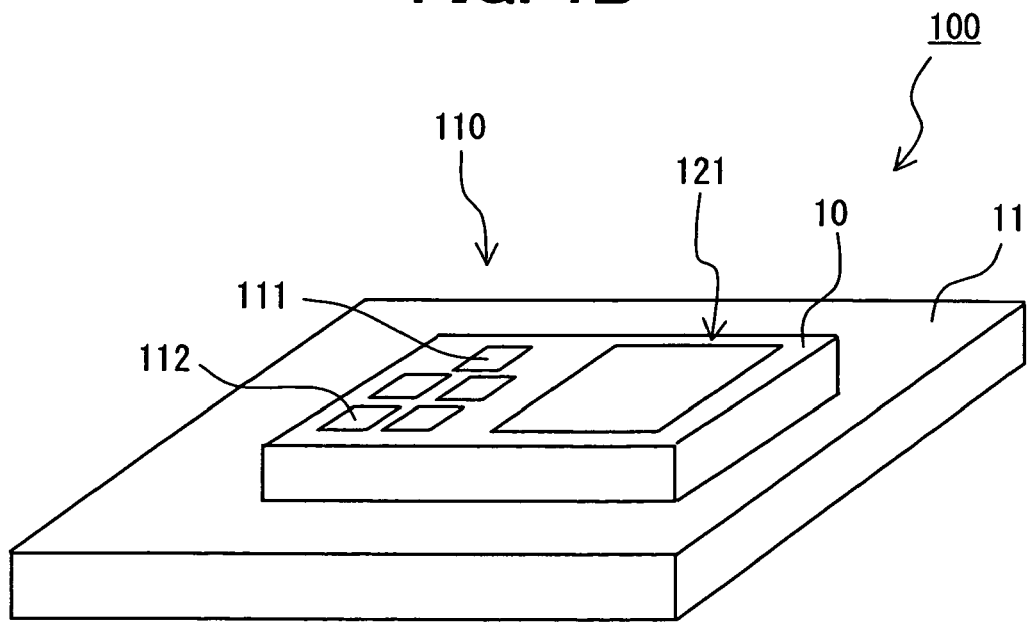
FIG. 1B is a perspective view showing the obstacle sensor.

FIGS. 1A to 1B are views showing a schematic configuration of the obstacle detector, wherein FIG. 1A is a cross section view, and FIG. 1B is a perspective view partially omitting a housing.

As shown in FIGS. 1A to 1B, an obstacle detector 100 has a supersonic sensor 110 for detecting an obstacle in a short distance with respect to a vehicle, and an image sensor 120 as a detection unit having a detection range that is at least partially different from a detection range of the supersonic sensor 110, which are disposed in the same housing 130.

In this way, according to the obstacle detector 100, the image sensor 120 having the detection range, which is at least partially different from the detection range of the supersonic sensor 110, is disposed with the supersonic sensor 110 in one housing 130. That is, a plurality of sensors 110 and 120, which can detect the obstacle and have different detection ranges, are fused together and thus configured as one device 100. Therefore, a small and inexpensive obstacle detector 100 is given while the device is configured to be able to detect an obstacle in a wider range, and detection accuracy can be improved by detecting the same obstacle by two sensors 110 and 120. The phrase, different detection ranges, means a condition other than a case that detection ranges completely correspond to each other. For example, the condition may include a case that one detection range includes the other detection range.

Moreover, in the embodiment, the supersonic sensor 110 and the image sensor 120 are disposed in the same housing 130, in addition, a transmission element 111 and a reception element 112 for forming the supersonic sensor 110, and a photodetection element 121 for forming the image sensor 120 are formed on the same semiconductor substrate 10 such as silicon substrate. That is, since the supersonic sensor 110 and the image sensor 120 are formed in a one-chip configuration, a further small and inexpensive obstacle detector 100 is given. In the image sensor 120, the supersonic sensor 110 can detect an obstacle in a wide angle region in a short distance, in which distortion tends to occur by a lens and the like, and the image sensor 120 can detect an obstacle in a long distance. Therefore, the obstacle detector 100 can detect an obstacle over a wide range.

For the photodetection element 121, a conventional CCD image sensor, CMOS image sensor or the like, which generates an electric signal in accordance with intensity of injected light, can be used. A control section processes an image signal that is a set of pixel values outputted from the image sensor 120, thereby, for example, output of an image based on an image signal, or detection (recognition) of the obstacle can be performed.

In this way, since the CCD image sensor or the CMOS image sensor is used for the photodetection element 121, the element 121 is easily integrated with the transmission element 111 and the reception elements 112 particularly on silicon as the semiconductor substrate 10. Moreover, a processing circuit section of the supersonic sensor 110 and the image sensor 120 can be formed on the semiconductor substrate 10. In the embodiment, the processing circuit section (omitted to be shown) of the supersonic sensor 110 and the image sensor 120 is formed on a circuit board 11.

The housing 130 in the embodiment is configured by the circuit board 11 mounted with the semiconductor substrate 10, and a case 12 fixed onto the circuit board 11, and the transmission element 111 and the reception elements 112 are electrically connected to the circuit board 11.

A region of the case 12 corresponding to the front (a top of the case 12) of the transmission element 111 and the reception elements 112 is a protection region 12a for protecting the transmission element 111 and the reception elements 112, and when the device is used for the vehicle, a material having weather resistance such as various metals (aluminum alloys), synthetic resin, glass, and rubber can be used for the region. The case 12 as a whole may be formed from the material, or only the protection region 12a may be formed from the material different from a material of the case. In the embodiment, the case 12 and the protection region 12a are formed from the same synthetic resin.

Separation members 12b are provided as a part of the case 12, which are for separating a space S between the protection region 12a of the case 12 and a surface of the semiconductor substrate 10 for each of the transmission element 111 and the reception elements 112. A filler 14 is disposed in the space S formed by the protection region 12a, separation members 12b, and semiconductor substrate 10. The separation member 12b may be configured to be a separated member from the case 12 and fixed to the case 12.

Here, acoustic impedance of a substance is expressed by the product of density of the substance and acoustic propagation velocity. A propagation characteristic of an acoustic wave between substances is deteriorated with increase in difference in acoustic impedance between the substances. That is, as difference in acoustic impedance between the filler 14 in the space S and the protection region 12a is increased, for example, a supersonic wave reflected by an obstacle is more easily reflected by the protection region 12a and thus hardly transferred to the filler 14.

Thus, one of liquid, sol and gel is used for the filler 14. In this case, acoustic impedance of the filler 14 can be approximated to acoustic impedance of the protection region 12a, consequently, for example, oscillation of the protection region 12a can be securely transferred to the reception element 112 via the filler 14. That is, sensitivity of each of the reception elements 112 can be improved.

In the embodiment, the transmission element 111 is formed in the same structure (described later) as the reception element 112. Accordingly, the acoustic impedance of the filler 14 is approximated to the acoustic impedance of the protection region 12a, thereby oscillation of the transmission element 111 can be securely transferred to the protection region 12a via the filler 14, consequently output of the transmission element 111 can be improved.

In the case of using synthetic resin for the protection region 12a, sol in which synthetic resin particles are dispersed in a liquid, or polymer gel including the relevant synthetic resin material can be used for the filler 14. The filler 14 is necessary to include a material that does not attack the reception element 112. Therefore, for example, silicon gel or fluorine gel can be used. When gas (such as air or an inert gas) exists in the space S, oscillation of the protection region 12a is hardly transferred to the reception element 112 (oscillation of the transmission element 111 is hardly transferred to the protection region 12a). Therefore, it is preferable that gas is completely removed from the space S, and then the filler 14 is filled. The above configuration (the protection region 12a, separation member 12b and filler 14) are described in detail in JP-A-2006-94459 previously filed by the applicant.

In a region of the case 12 corresponding to the front (the top of the case 12) of the photodetection element 121, a lens 122 for injecting light in a predetermined angle range to the photodetection element 121 is provided. Specifically, an opening 12c is provided in the top of the case 12, and the lens 122 is fixed to the case 12 in a manner of closing that opening 12c. That is, the case 12 is configured to shield light and transmit light via the lens 122 provided in the opening 12c. While an example that the lens 122 is fixed to an inner surface side of the case 12 is shown in FIG. 1A, a configuration where it is fixed to an outer surface side, or a configuration where it is fitted in the opening 12c may be used. Moreover, the lens 122 may be integrally formed with the case 12, rather than a separated member. A configuration of the housing 130 is not limited to the example. It is not particularly limited if it can accommodate the supersonic sensor 110 and the image sensor 120.

Figure 2:
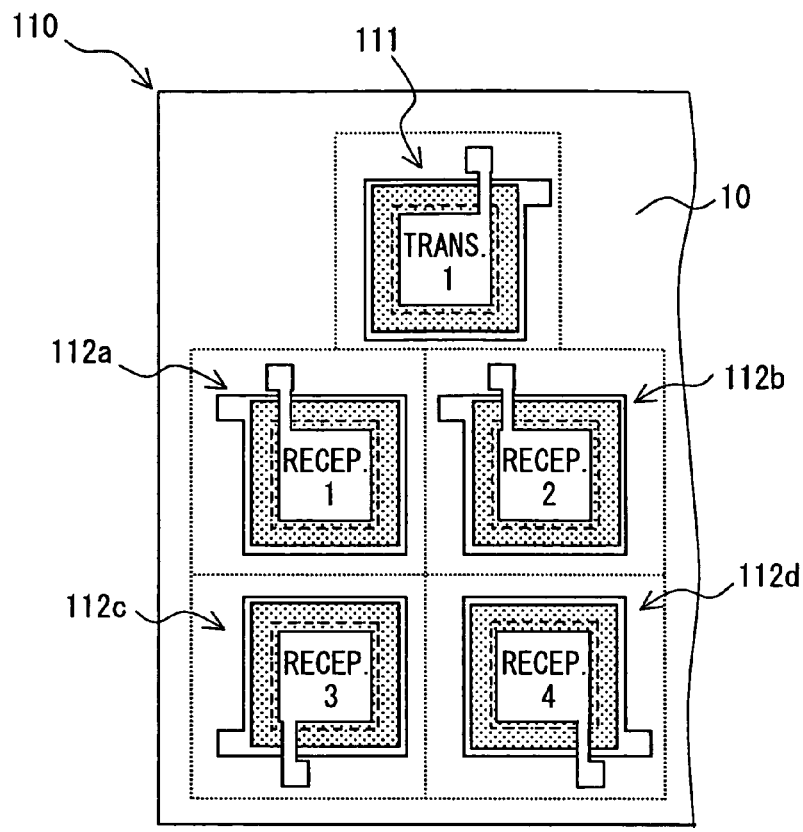
FIG. 2 is a partially enlarged plan view showing a supersonic sensor in the obstacle sensor.
Figure 3A:
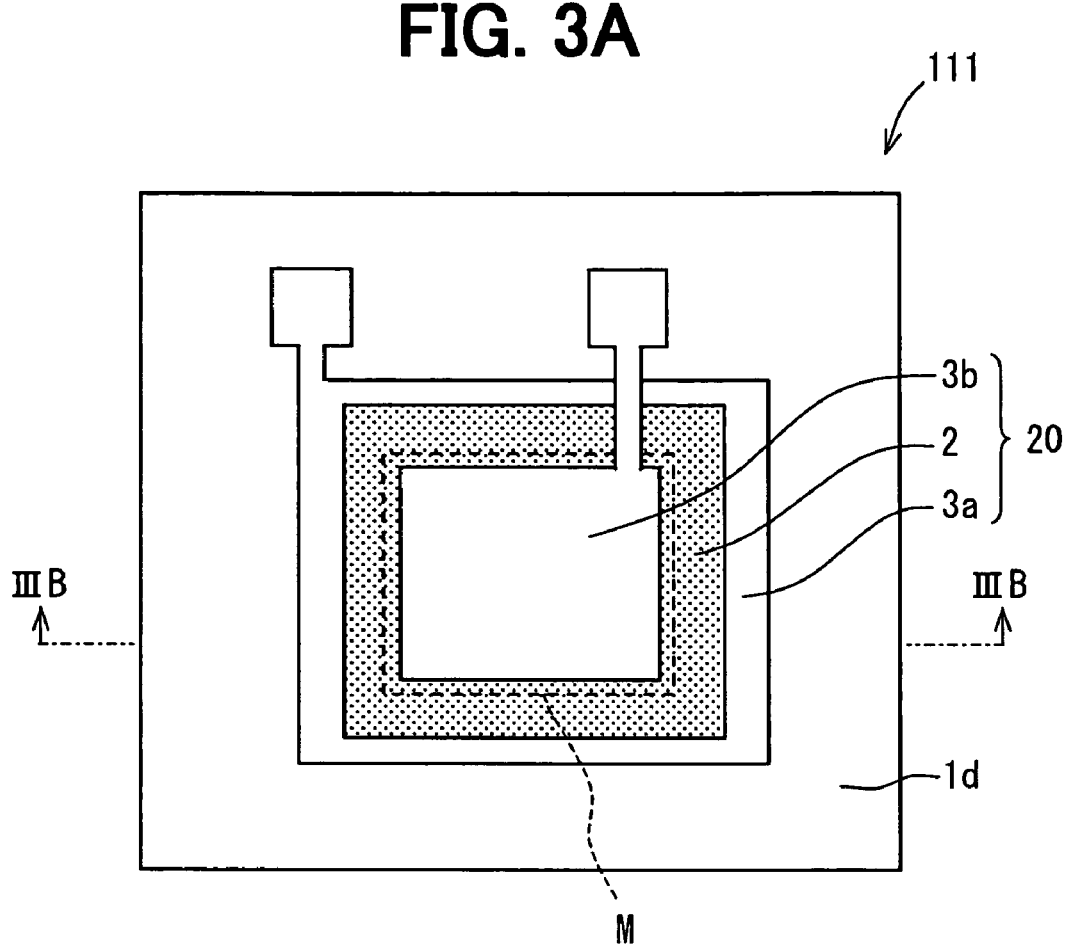
FIG. 3A is a plan view showing the supersonic sensor.
Figure 3B:
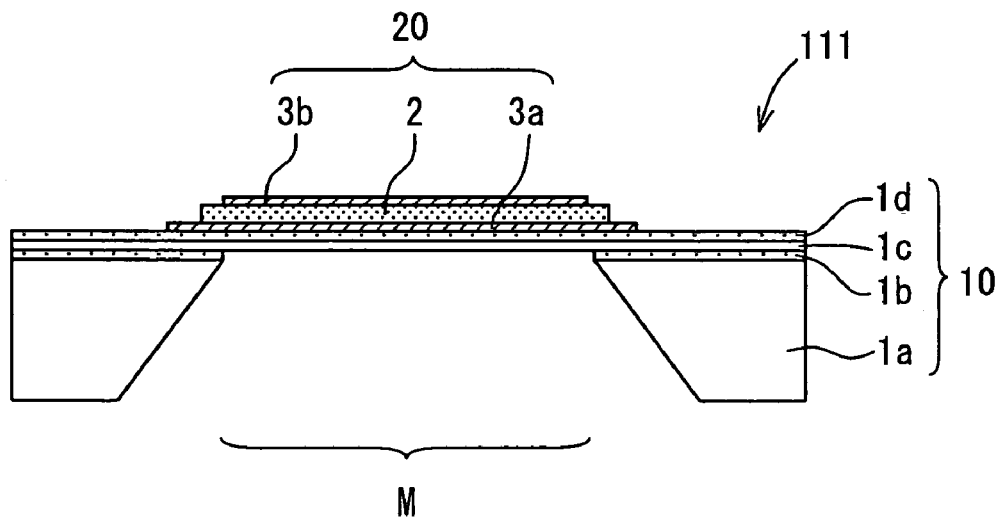
FIG. 3B is a cross sectional view showing the supersonic sensor taken along line IIIB-IIIB in FIG. 3A.

Next, a configuration of the supersonic sensor 110 as another feature point of the obstacle detector 100 according to the embodiment is described using FIG. 1B, FIG. 2 and FIGS. 3A to 3B. FIG. 2 is an expanded plane view of the periphery of the supersonic sensor 110 in the obstacle detector 100. FIGS. 3A to 3B are views showing a schematic configuration of elements forming the supersonic sensor 110, wherein FIG. 3A is a plane view seen from a top, and FIG. 3B is a cross section view along a line IIIB-IIIB of FIG. 3A.

As shown in FIG. 1B and FIG. 2, in the supersonic sensor 110, one transmission element 111 and four reception elements 112 (112a to 112d) are integrated on the same semiconductor substrate 10. The elements 111 and 112 have is in a configuration equal to each other.

Specifically, as shown in FIGS. 3A to 3B, the transmission element 111 is formed using the semiconductor substrate 10 in a SOI (Silicon On Insulator) structure. In the semiconductor substrate 10, a reference 1a indicates a first semiconductor layer (support substrate), a reference 1b indicates a buried oxide film, a reference 1c indicates a second semiconductor layer, and a reference 1d indicates a protective oxide film. On a membrane M, which is formed as a small thickness portion of the semiconductor substrate 10 by the semiconductor micromachining technique, a piezoelectric oscillator 20 is formed in a manner of covering the membrane M. The piezoelectric oscillator 20 has a structure of sandwiching a piezoelectric thin film 2 by electrode metal films 3a and 3b.

In the transmission element 111 configured in this way, alternating voltage is applied to the electrode metal films 3a and 3b of the piezoelectric oscillator 20 to resonate the membrane M with the piezoelectric oscillator 20 at a predetermined supersonic band frequency, thereby a supersonic wave can be transmitted. In the case of using the elements as the reception elements 112 (112a to 112d), the membrane M is resonated with the piezoelectric oscillator 20 by a supersonic wave that was reflected by an obstacle (object) and returned, and then oscillation is converted into an electric signal by the piezoelectric oscillator 20, so that the supersonic wave is received.

When the structure shown in FIGS. 3A and 3B is used for the transmission element 111 and the reception elements 112 (112a to 112d) of the supersonic sensor 110, since the transmission element 111 typically requires larger sound pressure output, area of a planar pattern of the membrane M in the transmission element 111 is preferably made larger than area of a planar pattern of the membrane M in the reception elements 112 (112a to 112d). Thus, sound pressure output of the transmission element 111 can be increased. On the contrary, in the reception elements 112 (112a to 112d), even a small area can be used if sufficient sensitivity is obtained.

Figure 4A:
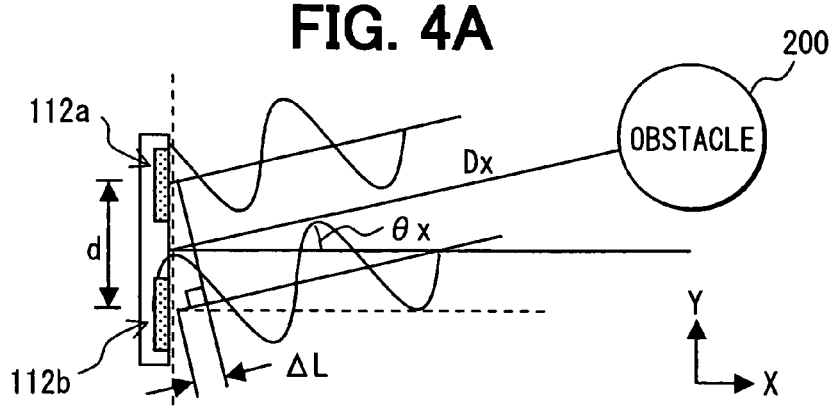
FIGS. 4A and 4B are schematic views explaining detection principle of the supersonic sensor.
Figure 4B:
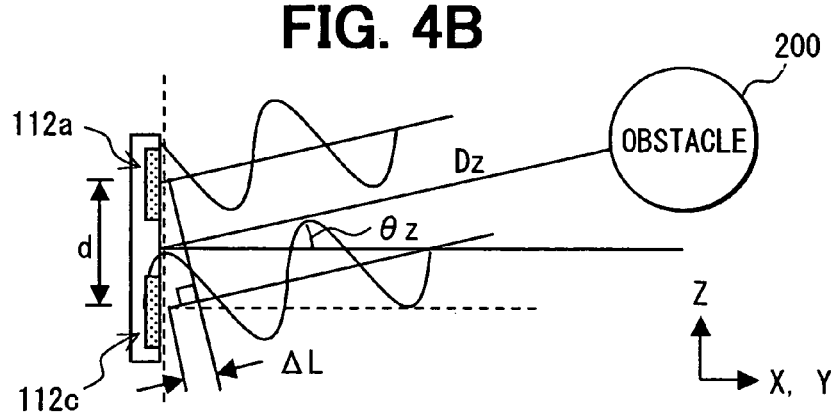
Figure 4C:
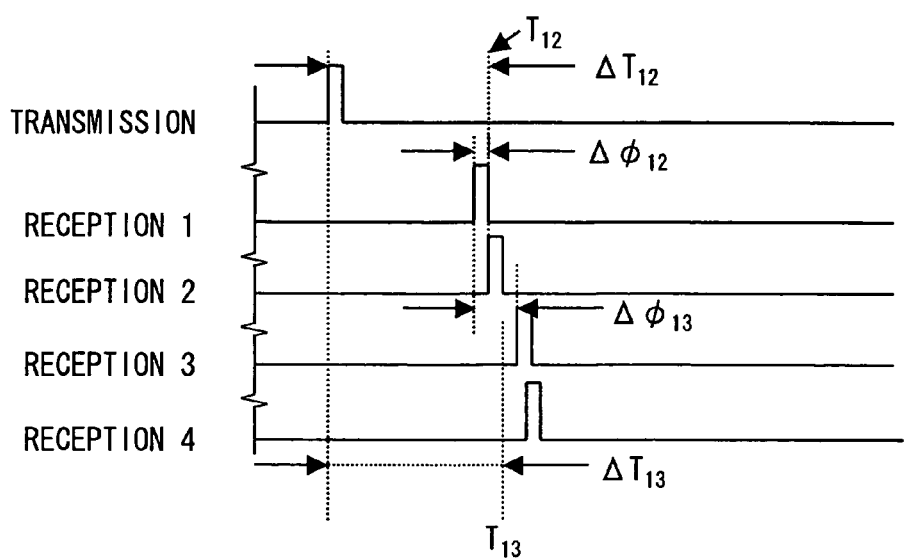
FIG. 4C is a timing chart of a signal explaining the detection principle of the supersonic sensor.

Next, a detection principle of the obstacle by the supersonic sensor 110 is described using FIGS. 4A to 4C. In FIGS. 4A to 4C, it is supposed that the obstacle detector 100 shown in FIG. 1b is used with being held perpendicularly to the ground with the transmission element 111 up.

FIG. 4A is a view schematically showing the reception elements 112a and 112b of the supersonic sensor 110, and a condition of a supersonic wave that is reflected by an obstacle 200 and injected into the reception elements 112a and 112b in an X-Y plane parallel to the ground. FIG. 4B is a view schematically showing the reception elements 112a and 112c of the supersonic sensor 110, and a condition of a supersonic wave that is reflected by an obstacle 200 and injected into the reception elements 112a and 112c in a plane perpendicular to the ground. FIG. 4C is a view schematically showing a time chart of a supersonic alternating pulse signal transmitted from the transmission element 111 of the supersonic sensor 110 and supersonic alternating pulse signals received by the four reception elements 112a to 112d.

Using the two reception elements 112a, 112b in the upper side shown in FIG. 2, a distance Dx to the obstacle 200 in the X-Y plane parallel to the ground as shown in FIG. 4A can be calculated from time difference $\Delta T_{12}$ between a transmission signal (transmission) of the transmission element 111 and an average time value $T_{12}$ of reception signals (reception No. 1 and reception No. 2) of the reception elements 112a and 112b as shown in FIG. 4C.

Using the two reception elements 112a and 112b in an upper side of FIG. 1, an azimuth θx of the obstacle 200 to an X axis in the X-Y plane parallel to the ground as shown in FIG. 4A can be calculated from phase difference $\Delta\theta_{12}$ between the signal (reception No. 1) of the reception element 112a and the signal (reception No. 2) of the reception element 112b as shown in FIG. 4C. Here, the reception element 112a receives a reception wave No. 1, and the reception element 112b receives a reception wave No. 2. ΔL in FIG. 4A represents a path difference, which is equal to d×cos(θx).

Similarly, using the two reception elements 112a, 112c in the left of FIG. 1, a distance Dz to the obstacle 200 in the plane perpendicular to the ground as shown in FIG. 4B can be calculated from time difference $\Delta T_{13}$ between the transmission signal (transmission) of the transmission element 111 and an average time value $T_{13}$ of reception signals (reception No. 1 and reception No. 3) of the reception elements 112a and 112c as shown in FIG. 4C. Here, the reception element 112c receives a reception wave No. 3, and the reception element 112d receives a reception wave No. 4. ΔL in FIG. 4B represents a path difference, which is equal to d×cos(θz).

Using the two reception elements 112a, 112c in the left as shown in FIG. 2, an azimuth θz of the obstacle 200 to the plane horizontal to the ground in the plane perpendicular to the ground as shown in FIG. 4B can be calculated from phase difference $\Delta_{13}$ between the signal (reception No. 1) of the reception element 112a and the signal (reception No. 3) of the reception element 112c as shown in FIG. 4C.

In this way, according to the supersonic sensor 110 in the embodiment, a distance and an azimuth of the obstacle 200 to the supersonic sensor 110 can be determined by using the distances Dx, Dz and the azimuths θx, θz.

The supersonic sensor 110 as shown in FIG. 1B and FIG. 2 can be reduced in size and inexpensive compared with the device configured with the transmission element (supersonic sound source) and the reception element being separately formed, because it is manufactured with the supersonic transmission element 111 and the reception elements 112 (112a to 112d) with being integrated on the same semiconductor substrate 10. Moreover, the supersonic sensor 110 as shown in FIG. 1B and FIG. 2 is hardly affected by mounting accuracy when it is equipped on the bumper of the car and the like, because a positional relationship between the transmission element 111 and the reception elements 112 (112a to 112d) is accurately set on the semiconductor substrate 10.

Moreover, even if the number of the transmission element 111 and the reception elements 112 formed on the same semiconductor substrate 10 is increased, or even if size of the transmission element 111 and the reception elements 112 is changed, the supersonic sensor 110 can respond to it only by changing a mask, consequently manufacturing cost is substantially not changed in a resultant supersonic sensor 110.

While supersonic sensor 110 shown in FIG. 1B and FIG. 2 has four reception elements 112 (112a to 112d), it uses only a combination of three reception elements 112 (112a to 112c) for detection of the obstacle (object) 200 as shown in FIGS. 4A to 4C. That is, it uses the two reception elements 112a and 112b in the upside of FIG. 2 in measurement of the distance Dx to the obstacle 200 in the X-Y plane parallel to the ground and the azimuth θx of the obstacle 200 to the X axis in FIG. 4A; and it uses the two reception elements 112a and 112c in the left of FIG. 2 for the distance Dz to the obstacle 200 in the plane perpendicular to the ground and the azimuth θz of the obstacle 200 to the plane parallel to the ground as shown in FIG. 4B.

On the other hand, similarly as the above, the distance Dx to the obstacle 200 in the X-Y plane parallel to the ground and the azimuth θx of the obstacle 200 to the X axis in FIG. 4A can be measured by using the two reception elements 112c and 112d in a lower side of FIG. 2; and the distance Dz to the obstacle 200 in the plane perpendicular to the ground and the azimuth θz of the obstacle 200 to the plane parallel to the ground as shown in FIG. 4B can be measured by using the two reception elements 112b and 112d in the right of FIG. 2. In other words, the obstacle (object) 200 can be detected by using a combination of the three reception elements 112b to 112d.

Accordingly, in the supersonic sensor 110 having the four reception elements 112 (112a to 112d), data of the obstacle (object) 200 measured by the two kinds of combinations are compared, and when they do not correspond to each other, it can be determined that one of the four reception elements 112 (112a to 112d) malfunctions. In this way, the supersonic sensor 110 may be allowed to have malfunction detection capability.

When only one reception element 112 malfunctions, the obstacle (object) 200 can be detected similarly as above by using a combination of three reception elements 112 other than the one element. Therefore, the supersonic sensor 110 may be also allowed to have fail-safe capability.

If the supersonic sensor 110 is allowed to have only the malfunction detection capability, it can be given even by three reception elements 112 (112a to 112c). That is, data of the obstacle (object) 200 are calculated from combinational data of the reception elements 112a and 112b, and combinational data of the reception elements 112a and 112c, and combinational data of the reception elements 112b and 112c can be used for check of data of the obstacle (object) 200. Thus, a supersonic sensor 110 having the three reception elements 112 (112a to 112c) can be allowed to have the malfunction detection capability.

As hereinbefore, in the supersonic sensor 110 having at least three reception elements 112, even if one reception element 112 is damaged or malfunctions, the sensor can be configured to have the malfunction detection capability by comparing signals of other reception elements 112 to one another. Moreover, the supersonic sensor 110 having at least four reception elements 112 can be allowed to have even the fail-safe capability. Thus, a supersonic sensor 110 or an obstacle detector 100, which is inexpensive and can respond to malfunction due to the water drop or adhesion of dust, can be given.

Moreover, the supersonic sensor 110 shown in FIG. 1B and FIG. 2 can be designed in a way that the transmission element 111 transmits at least two supersonic waves having different frequencies by temporally changing frequency of an alternating pulse signal applied to the transmission element 111. Thus, the supersonic sensor 110 shown in FIG. 1B and FIG. 2 can be configured to have humidity correction capability through simple arithmetic processing. To transmit supersonic waves having different frequencies by a single transmission element 111, the supersonic waves having different frequencies can be transmitted by controlling input voltage with frequencies which do not induce resonance of the membrane M shown in FIG. 3.

Figure 5:
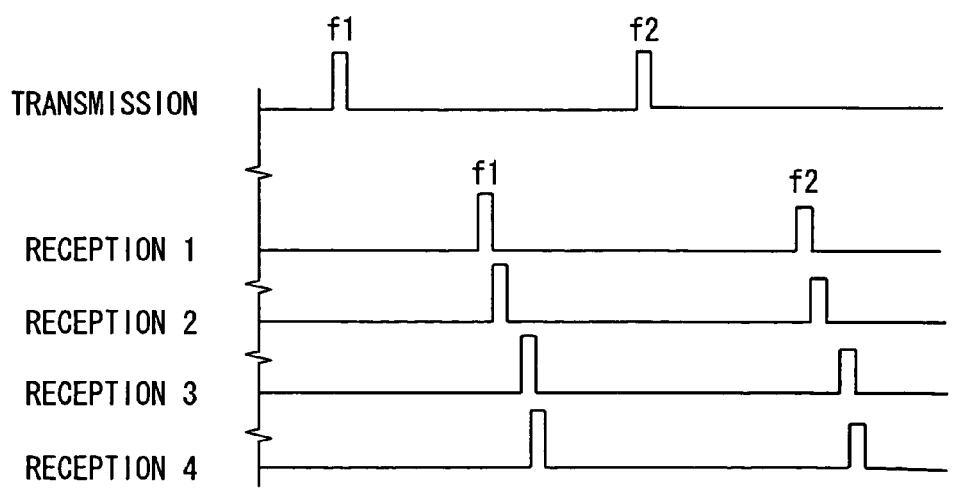
FIG. 5 is a timing chart of a signal explaining compensation of humidity by the supersonic sensor.

FIG. 5 is a view for illustrating the humidity correction capability. FIG. 5 is a view schematically showing a time chart of a supersonic alternating pulse signal transmitted by the transmission element 111, and supersonic alternating pulse signals received by the four reception elements 112 (112a to 112d) in the case that the transmission element 111 of the supersonic sensor 110 shown in FIG. 1B and FIG. 2 is designed to transmit two kinds of supersonic waves having different frequencies f1 and f2. Here, the following equations express attenuation loss P of a supersonic wave and an absorption coefficient m of the supersonic wave.

$$P \propto e^{-mr} \qquad \text{(Formula No. 1)}$$

-continued $$m = (33 + 0.2 \times T) \times f^2 \times 10^{-12} + \frac{Mf}{k/2\pi f + 2\pi f/k} \quad \text{(Formula No. 2)}$$

$$k = 1.92 \times \left(\frac{G0}{G} \times h\right)^{1.3} \times 10^5 \quad \text{(Formula No. 3)}$$

P in F1 represents an attenuation loss (i.e., an absorption of acoustic wave), r represents a propagation distance, and m in F2 represents an absorption coefficient. M represents a coefficient, f represents a frequency, T represents a temperature, G0 represents a saturation vapor pressure, G represents a total atmospheric pressure, and h represents a humidity.

When the transmission element 111 of the supersonic sensor 110 transmits the supersonic wave at the frequency f1 and the supersonic wave at the frequency f2 while periodically changing one to another as shown in FIG. 5A, reception signals (reception 1 to reception 4) corresponding to the supersonic waves at the frequency f1 and the frequency f2 appear in the four reception elements 112 (112a to 112d) respectively. A relationship between the alternating pulse signal of the transmission element 111 and the alternating pulse signals of the reception elements 112 (112a to 112d) at the frequency f1, and a relationship between the alternating pulse signal of the transmission element 111 and the alternating pulse signals of the reception elements 112 (112a to 112d) at the frequency f2 are the same in FIG. 4C, respectively.

On the other hand, in FIG. 5, even if a level of the alternating pulse signal at the frequency f1 transmitted by the transmission element 111 is the same as that at the frequency f2, levels of the alternating pulse signals at the frequency f2 received by the reception elements 112 (112a to 112d) are largely attenuated compared with levels of the. supersonic alternating pulse signals at the frequency f1.

As described in the above formulas F1-F3, the attenuation loss P (absorption coefficient m) of a supersonic wave depends on frequency f of the supersonic wave, and attenuation is increased with increase in frequency f of a supersonic wave. Moreover, the attenuation loss P (absorption coefficient m) of the supersonic wave has a value depending on not only frequency, but also temperature T and humidity h of propagation environment.

Here, a value of the frequency f of the supersonic wave is previously set for each of the transmission element 111 and the reception elements 112 (112a to 112d). When the supersonic sensor 110 is for in-vehicle use, the temperature T of propagation environment can be measured by an ambient temperature sensor and the like. On the contrary, for the humidity h of propagation environment, there is not any appropriate humidity sensor that can be mounted outside the vehicle interior.

However, in FIG. 5, since the supersonic wave is measured using the two kinds of frequencies f1 and f2, the humidity h can be calculated backward from difference in attenuation coefficient between them. The calculated humidity h is used for correction of operative humidity previously set for the supersonic sensor 110, thereby the supersonic sensor 110 can be allowed to have humidity correction capability. Thus, a supersonic sensor 110 that is inexpensive and can respond to a difficulty of deterioration of detection accuracy due to humidity change, and an obstacle detector 100 having that supersonic sensor 110 can be given.

When the supersonic sensor 110 is allowed to have the humidity correction capability as above, at least two transmission elements 111 are preferably provided. In this case, unlike a case of using a single transmission element 111, each of the transmission elements 111 can transmit a supersonic wave having a high Q value at a different frequency using the resonance frequency of the membrane M shown in FIG. 3B.

Figure 6A:
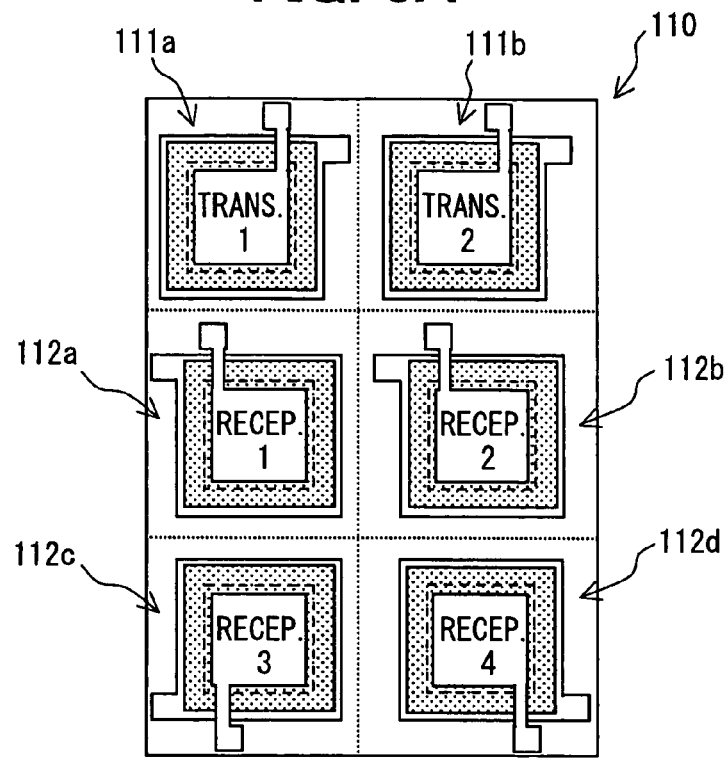
FIG. 6A is a plan view showing a supersonic sensor in an obstacle sensor according to a modification of the first embodiment.
Figure 6B:
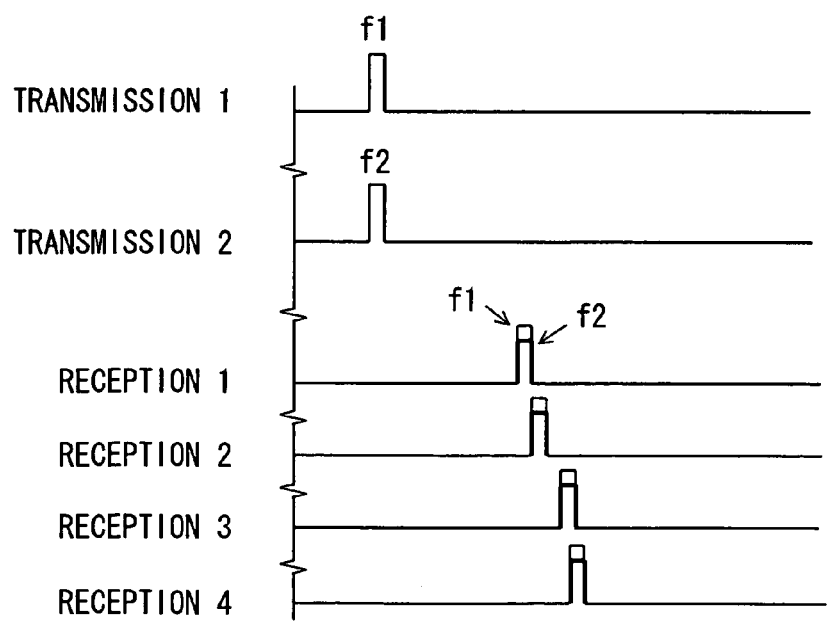
FIG. 6B is a timing chart showing alternative pulse signals outputted from two transmission elements and alternative pulse signals received by four reception elements.

FIGS. 6A to 6B show such a supersonic sensor 110. FIG. 6A is a plane view of the supersonic sensor 110 seen from a top, and FIG. 6B is a view schematically showing a time chart of supersonic alternating pulse signals transmitted by two transmission elements 111 (111a, 111b), and supersonic alternating pulse signals received by the four reception elements 112 (112a to 112d).

The supersonic sensor 110 shown in FIG. 6A can transmit supersonic waves having two kinds of frequencies f1 and f2 at the same time as shown in FIG. 6B by using the two transmission elements 111 (111a, 111b) that transmit supersonic waves at different frequencies f1 and f2. Thus, correction for motion of a car and the like are unnecessary. Since the supersonic waves at the different frequencies f1 and f2 have the same propagation velocity, reflected waves reach to respective reception elements 112 (112a to 112d) at the same time. Therefore, frequency analysis for decomposing reception signals of respective reception elements 112 (112a to 112d) with frequency components f1 and f2 is necessary.

Figure 7:
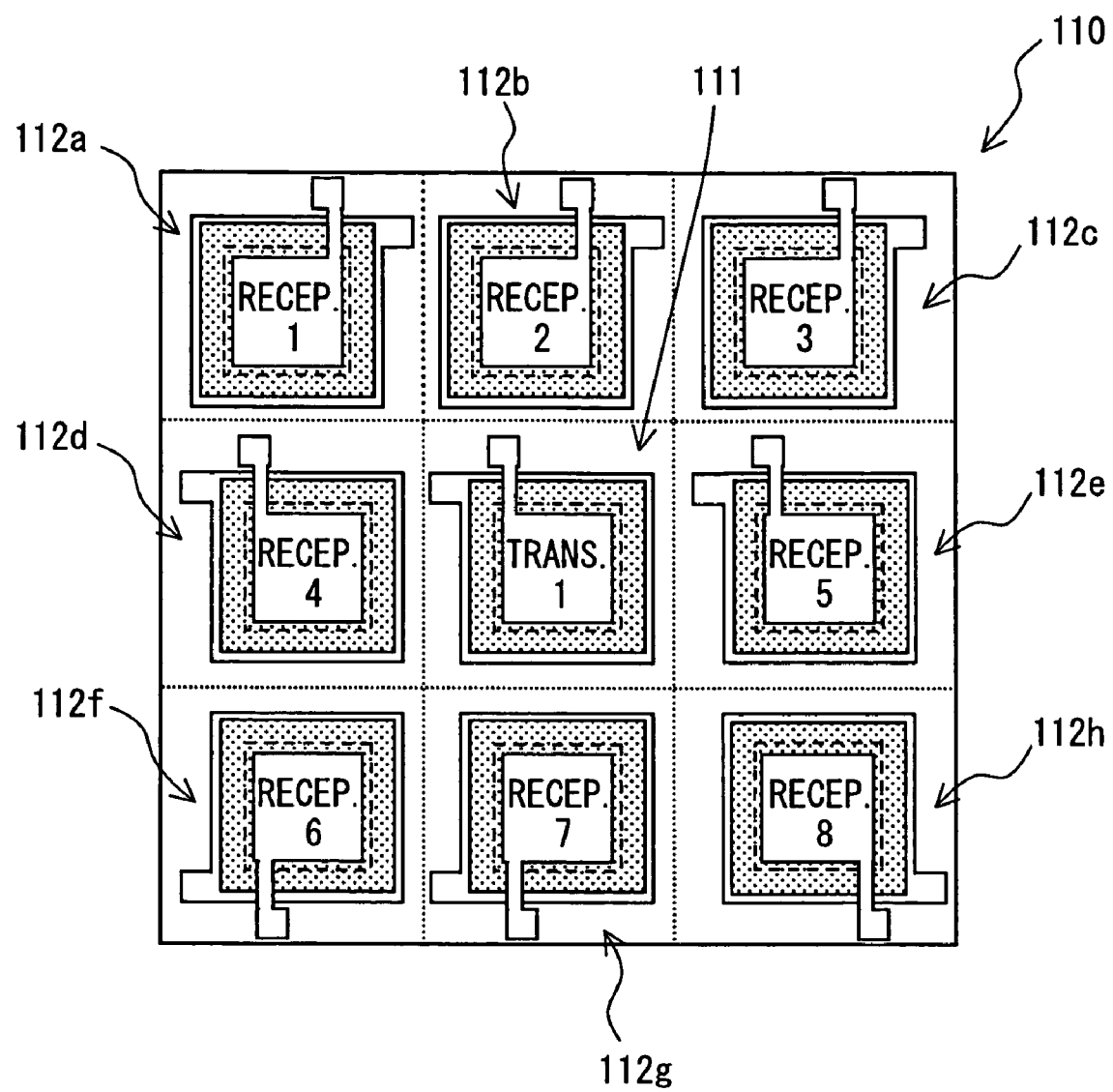
FIG. 7 is a plan view showing a supersonic sensor in an obstacle sensor according to a second modification of the first embodiment.

FIG. 7 is a plane view seen from a top, showing a modification of the supersonic sensor 110. In the supersonic sensor 110 shown in FIG. 7, one transmission element 111 is located at the center, and eight reception elements 112 (112a to 112h) enclose the periphery of the transmission element.

When one transmission element 111 and even numbers of reception elements 112 are given in this way, it is preferable that the reception elements 112 enclose the transmission element 111, and are disposed by twos at symmetric positions with respect to the transmission element 111. Thus, in the reception elements 112 disposed by twos at the symmetric positions with respect to the transmission element 111, sound pressure of supersonic waves, which were transmitted from the transmission element 111, then reflected by an obstacle and then returned, can be approximately equalized. Therefore, accurate detection and measurement of the obstacle can be performed.

The supersonic sensors 110 as shown hereinbefore are configured to be small, inexpensive, and hardly affected by mounting accuracy when they are equipped on the bumper of the car and the like, and be able to eliminate the difficulty of deterioration of detection accuracy due to adhesion of the water drop or dust and humidity change. Therefore, the sensors are preferably used for the obstacle detector 100 for in-vehicle use.

In the supersonic sensor 110 of the obstacle detector 100 according to the embodiment, the number of transmission elements 111 and reception elements 112 integrated on the same semiconductor substrate 10 is not limited to those in the above examples. The sensor can include at least one transmission element 111 and at least two reception elements 112. By increasing the number of reception elements 112, information with higher resolution can be obtained. The number of transmission elements 111 can be also increased to be at least two. Thus, sound pressure of a supersonic wave to be transmitted can be increased, or directivity of the wave can be controlled.

When the transmission element 111 and the reception elements 112 are formed on the same semiconductor substrate 10, a transmission signal may be inputted into a reception element, causing a noise, however, the embodiment uses a configuration in which the reception elements 112 are arrayed, so that a signal being transmitted is received by a plurality of reception elements 112 and thus cancelled. Thus, a near obstacle 200 can be detected with a signal having an increased S/N ratio.

In the embodiment, a piezoelectric-type supersonic sensor 110 using a piezoelectric material has been shown. However, a capacitance type supersonic sensor 110 that detects capacitance change between electrodes, or a piezo-type supersonic sensor 110 that detects output of a gage by pressure may be used in addition to the piezoelectric type. Moreover, a supersonic sensor 110 in combination of these types may be used.

Figure 8A:
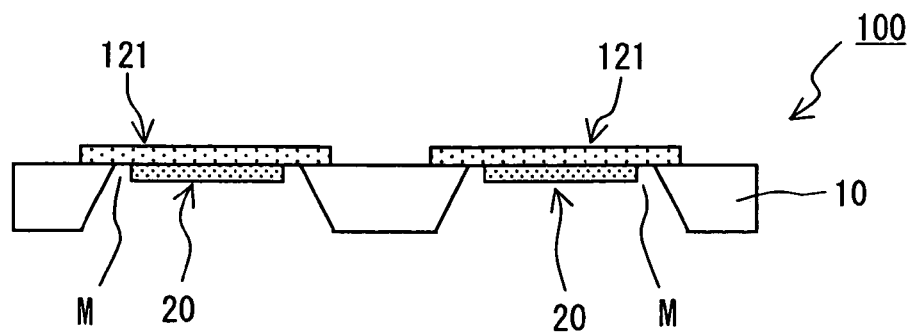
FIG. 8A is a cross sectional view showing a supersonic sensor in an obstacle sensor according to a third modification of the first embodiment.
Figure 8B:
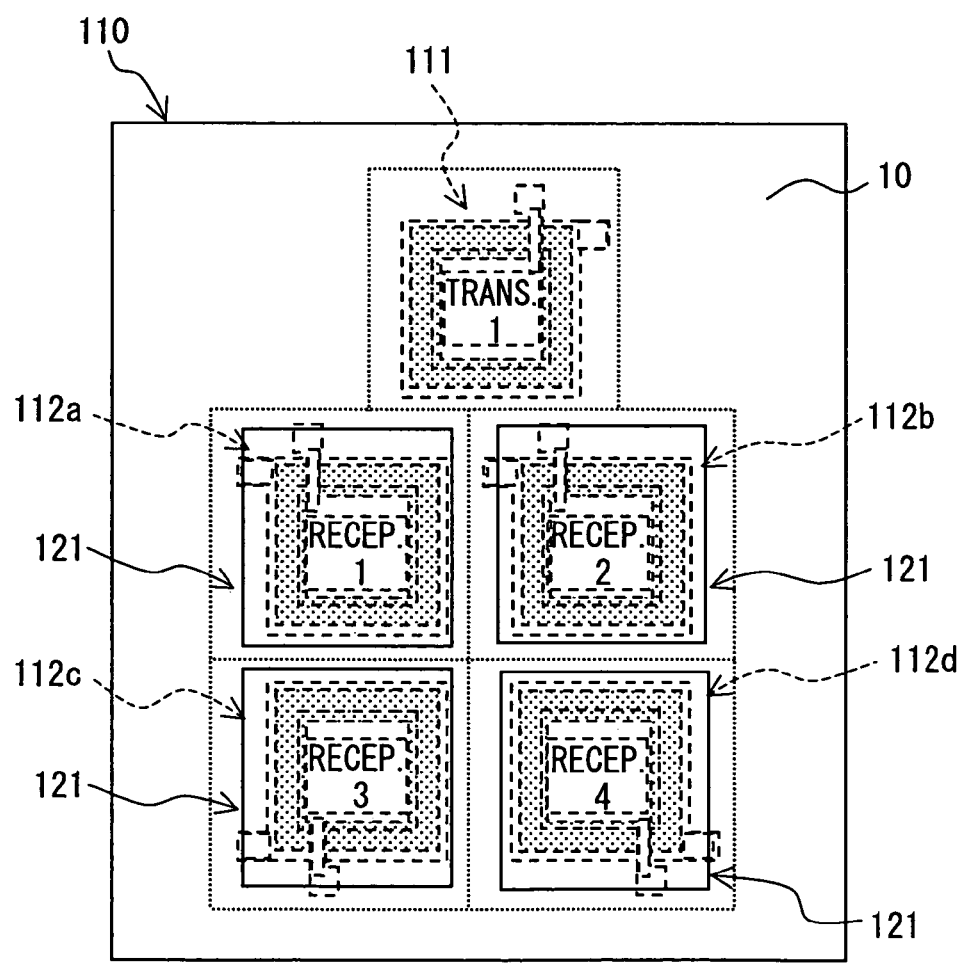
FIG. 8B is a plan view showing the supersonic sensor in the obstacle sensor according to the third modification.

In the embodiment, an example was shown, in which the transmission element 111 and the reception elements 112 for forming the supersonic sensor 110, and the photodetection element 121 for forming the image sensor 120 are formed in different regions of the same semiconductor substrate 10. However, as shown in FIGS. 8A to 8B, at least part of the photodetection element 121 may be formed on the membrane M. That is, a configuration may be used, in which a region for forming the transmission element 111 and the reception elements 112 is overlapped with at least part of a region for forming the photodetection element 121 in a planar direction of the semiconductor substrate 10. FIGS. 8A to 8B are views showing a modification of the obstacle detector 100, wherein FIG. 8A is a cross section view, and FIG. 8B is a plane view seen from a top. In FIG. 8, the housing 130 is omitted.

In such a configuration, since a sensor formation region can be reduced, the obstacle detector 100 can be further minimized. At that time, particular care needs to be taken to prevent reduction in transmission output or reception sensitivity due to formation of the photodetection element 121 on the membrane M. While an example was shown, in which the piezoelectric oscillators 20 for forming the transmission element 111 and the reception elements 112 were formed on a back to a surface on which the photodetection elements 121 were formed as shown in FIG. 8A, they may be formed on the same surface (for example, a surface for forming the photodetection elements 121 as shown in FIG. 8A). In this case, electrical connection to a processing circuit section and the like is facilitated.

In FIG. 8B, an example was shown, in which the photodetection elements 121 were formed correspondingly to respective formation regions of the four reception elements 112 (112a to 112d). In such a configuration, oscillation can be prevented from being transferred to another reception element 112 via the photodetection element 121. Accordingly, detection accuracy can be improved. However, a single photodetection element 121 may be formed in one region in a manner of covering all the formation regions of the reception elements 112. Moreover, in addition to the reception elements 112, the photodetection element 121 may be formed on the membrane M for forming the transmission element 111.

Second Embodiment

Next, a second embodiment of the invention is described according to FIG. 9. FIG. 9 is a plane view seen from a top, showing a schematic configuration of the obstacle detector 100 in the embodiment. In FIG. 9, the housing is omitted to be shown for convenience.

Since the obstacle detector 100 in the second embodiment has many points in common with those in the first embodiment, hereinafter common portions are omitted to be described in detail, and different portions are selectively described.

As shown in FIG. 9, the obstacle detector 100 according to the embodiment uses a configuration having at least an infrared sensor 140 for detecting infrared rays from an obstacle as a detection unit instead of the image sensor 120 shown in the first embodiment.

In this way, according to the obstacle detector 100, the infrared sensor 140 having a detection range, which is at least partially different from the detection range of the supersonic sensor 110, is disposed together with the supersonic sensor 110 in one housing (not shown). That is, a plurality of sensors 110 and 140, which can detect the obstacle and have different detection ranges, are fused together and thus configured as one device 100. Accordingly, a small and inexpensive obstacle detector 100 is given while it is configured to be able to detect an obstacle in a wider range.

In the embodiment, the supersonic sensor 110 and the infrared sensor 140 are formed on the same semiconductor substrate 10 such as silicon substrate. That is, since the supersonic sensor 110 and the infrared sensor 140 are formed in a one-chip configuration, a further small and inexpensive obstacle detector 100 is given. Moreover, the supersonic sensor 110 can detect an obstacle in a short distance, and the infrared sensor 140 can detect an obstacle in a long distance. Therefore, the obstacle detector can detect an obstacle over a wide range. Since both of the supersonic sensor 110 and the infrared sensor 140 can detect an obstacle at night, an obstacle detector 100 for night use may be realized. Infrared rays from an obstacle may be infrared rays emitted from the obstacle, or infrared rays reflected by the obstacle.

The sensor uses a thermopile infrared sensor 140 including a thermocouple 141 as an infrared detection element that generates an electric signal based on temperature change occurring when the element receives an infrared ray, and an infrared-ray absorption film 142 that covers at least part of the thermocouple 141. A configuration of the infrared sensor 140 is previously disclosed by the applicant in JP-A-2002-365140. However, the configuration of the infrared sensor 140 is not limited to that in the example.

In the embodiment, the device has an infrared light source 150 that radiates infrared rays by inducing heat generation of a resistor 151 as a detection unit in addition to the infrared sensor 140. Accordingly, an obstacle reflects an infrared ray emitted from the infrared light source 150, and the infrared sensor 140 detects reflected light, thereby the obstacle can be detected. The infrared light source 150 is also formed on the same semiconductor substrate 10. Accordingly, since a positional relationship between the infrared light source 150 and the infrared sensor 140 can be accurately set on the substrate, the device is hardly affected by mounting accuracy. Moreover, the obstacle detector 100 can be further miniaturized. A reference M in FIG. 9 indicates membranes for forming the infrared sensor 140 and the infrared light source 150 respectively.

In the above, an example was shown, in which the infrared sensor 140 and the infrared light source 150 are formed in different regions from a region for forming the supersonic sensor 110. However, a configuration may be used, in which a region for forming the supersonic sensor 110 is at least partially overlapped with a region for forming the infrared sensor 140 and the infrared light source 150 in a planar direction of the semiconductor substrate 10.

Figure 10A:
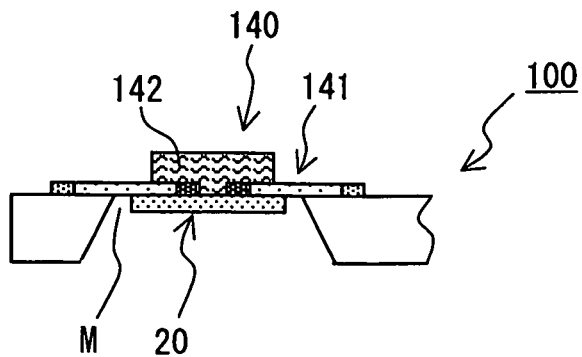
FIG. 10A is a cross sectional view showing a supersonic sensor in an obstacle sensor according to a modification of the second embodiment.
Figure 10B:
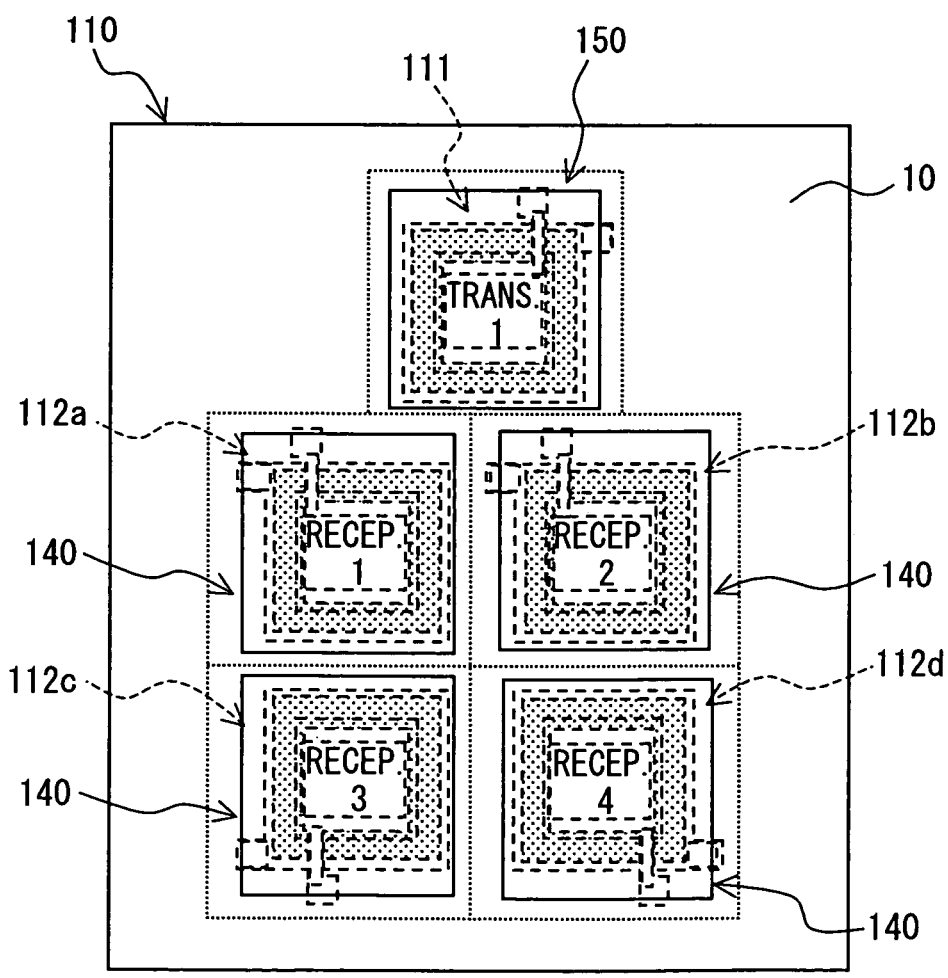
FIG. 10B is a plan view showing the supersonic sensor in the obstacle sensor according to the modification.

For example, as shown in FIGS. 10A and 10B, it is acceptable that the infrared light source 150 is formed on the transmission element 111, and infrared sensors 140 are formed correspondingly to formation regions of four reception elements 112 (112a to 112d) respectively. In such a configuration, since the sensor formation region can be reduced, the obstacle detector 100 can be further miniaturized. Moreover, since a plurality of infrared sensors 140 is provided, detection accuracy can be improved. FIGS. 10A to 10B are views showing a modification of the obstacle detector 100 as shown in the embodiment, wherein FIG. 10A is a cross section view, and FIG. 10B is a plane view seen from a top. In FIG. 10, the housing 130 is omitted for convenience.

Particular care needs to be taken to prevent reduction in transmission output or reception sensitivity due to formation of the infrared sensor 140 or the infrared light source 150 on the membrane M for forming the transmission element 111 and the reception elements 112. An example was shown, in which the piezoelectric oscillators 20 for forming the transmission element 111 and the reception elements 112 were formed on a back to a surface for forming the infrared sensors 140 or the infrared light source 150 as shown in FIGS. 10A and 10B. However, both may be formed on the same surface (for example, a surface for forming the infrared sensors 140 as shown in FIG. 10A). In this case, electrical connection to a processing circuit section and the like is facilitated.

Third Embodiment

Next, a third embodiment of the invention is described according to FIG. 11. FIG. 11 is a perspective views showing a schematic configuration of an obstacle detector 100 in the embodiment. In FIG. 11, a housing is partially omitted to be shown for convenience.

Since the obstacle detector 100 in the third embodiment has many points in common with those in the first or second embodiment, hereinafter common portions are omitted to be described in detail, and different portions are selectively described.

As shown in FIG. 11, the obstacle detector 100 uses a radar unit 160 having a laser generation element 161 that generates a transmission wave and a laser detection element 162, in which when the element receives a reflected wave reflected by an obstacle, it generates an electric signal corresponding to intensity of the reflected wave, as a detection unit instead of the image sensor 120 shown in the first embodiment.

In this way, according to the obstacle detector 100, the radar unit 160 having a detection range, which is at least partially different from the detection range of the supersonic sensor 110, is disposed together with the supersonic sensor 110 in one housing (omitted to be shown). That is, a plurality of sensors 110 and 160, which can detect the obstacle and have different detection ranges, are fused together and thus configured as one device 100. Accordingly, a small and inexpensive obstacle detector 100 is given while it is configured to be able to detect an obstacle in a wider range.

In the embodiment, the transmission element 111 and the reception elements 112 (112a to 112d) for forming the supersonic sensor 110 and the laser generation element 161 and the laser detection element 162 for forming the radar unit 160 are formed on the same semiconductor substrate 10 such as silicon substrate. That is, since the supersonic sensor 110 and the radar unit 160 are formed in a one-chip configuration, a further small and inexpensive obstacle detector 100 is given. Moreover, the supersonic sensor 110 can detect an obstacle in a short distance, and the radar unit 160 can detect an obstacle in a long distance. Therefore, the obstacle detector can detect an obstacle over a wide range.

For the laser generation element 161, a conventional semiconductor laser element such as GaAs base laser element can be used; and for the laser detection element 162, a photodiode can be used. When the laser generation element 161 is formed on the same semiconductor substrate 10 on which the transmission element 111 and the reception elements 112 were formed, heterogeneous materials that can be combined, for example, by hetroepitaxy are selected and used for the semiconductor substrate 10 and the laser generation element 161, thereby they can be integrated. In addition to this, a separately formed laser generation element 161 may be mounted on the semiconductor substrate 10.

Figure 12:
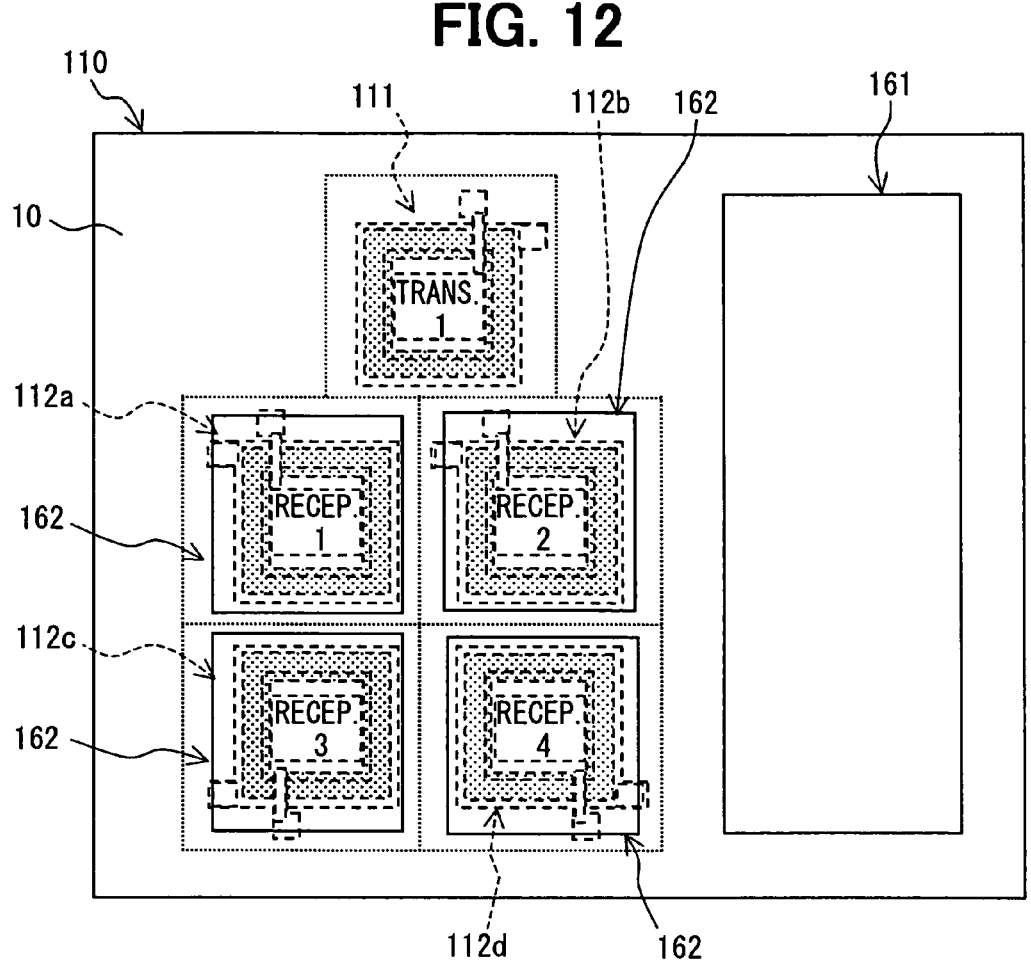
FIG. 12 is a plan view showing an obstacle sensor according to a modification of the third embodiment of the present invention.

As shown in FIGS. 8A to 8B, at least part of the laser detection element 162 can be formed on the membrane M for forming the transmission element 111 and the reception elements 112. That is, as shown in FIG. 12, a configuration can be used, in which a region for forming the transmission element 111 and the reception elements 112 is overlapped with at least part of a region for forming the laser detection elements 162 in a planar direction of the semiconductor substrate 10. FIG. 12 is a plane view seen from a top, showing a modification of the obstacle detector 100 according to the embodiment, wherein the housing 130 is omitted for convenience.

In such a configuration, since a sensor formation region can be reduced, the obstacle detector 100 can be further miniaturized. At that time, particular care needs to be taken to prevent reduction in transmission output or reception sensitivity due to formation of the laser detection element 162 on the membrane M.

The piezoelectric oscillators 20 for forming the transmission element 111 and the reception elements 112 may be formed on the same surface for forming the laser detection elements 162 or may be formed on a back. In FIG. 12, an example was shown, in which the laser detection elements 162 were formed correspondingly to respective formation regions of the four reception elements 112 (112a to 112d). In such a configuration, oscillation can be prevented from being transferred to another reception element 112 via the laser detection element 162. Accordingly, detection accuracy can be improved. However, a single laser detection element 162 may be formed in one region in a manner of covering all the formation regions of the reception elements 112. Moreover, the laser detection element 162 may be formed on a membrane M for forming the transmission element 111 in addition to the reception elements 112.

In the embodiment, an example was shown, in which the laser generation element 161 and the laser detection element 162 were provided as the radar unit 160. However, a configuration of having a millimeter-wave generation element and a millimeter-wave detection element may be used in place of the above configuration.

While preferred embodiments of the invention have been described hereinbefore, the invention is not limited to only the described embodiments, and can be practiced in variously modified manners.

For the detection units, in addition to the configurations shown in the embodiments, any other configurations can be used if they have a detection range that is at least partially different from the detection range of the supersonic sensor 110, and can detect an obstacle within the detection range.

Figure 13:
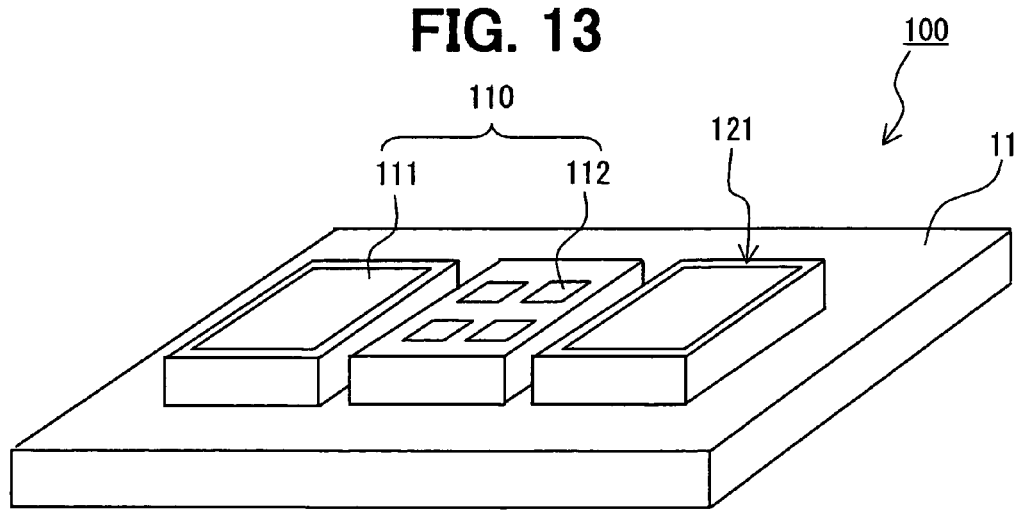
FIG. 13 is a perspective view showing an obstacle sensor according to a second modification of the third embodiment of the present invention.

Moreover, each of the supersonic sensor 110, image sensor 120, infrared sensor 140, infrared light source 150, and radar unit 160 shown in the embodiments merely shows an aspect thereof. If each of them can be disposed in the housing 130, and further preferably. can be configured on the same substrate as the transmission element 111 and the reception elements 112 for forming the supersonic sensor 110, it is more acceptable. Moreover, as shown in FIG. 13, a configuration may be used, in which the transmission element 111 and the reception elements 112 for forming the supersonic sensor 110, and other detection units (for example, the photodetection element 121 of the image sensor 120) are formed on separated substrates respectively, then the respective substrates are disposed on a common substrate (for example, the circuit board 11), and then the common substrate is disposed in the same housing 130. FIG. 13 is a plane view seen from a top, showing a modification of the obstacle detector.

The present disclosure has the following aspects.

According to an aspect of the present disclosure, an obstacle sensor for detecting an obstacle includes: a supersonic sensor for detecting the obstacle in a first range, wherein the supersonic sensor includes a substrate, a transmission device for transmitting a supersonic wave by converting an electric signal, and a reception device for receiving the supersonic wave and for converting the supersonic wave to an electric signal, and wherein the transmission device and the reception device are disposed on the substrate; a detection element for detecting the obstacle in a second range; and a case. The reception device includes multiple reception elements. At least a part of the first range of the supersonic sensor is different from the second range of the detection element. The supersonic sensor and the detection element are disposed in the case.

In the above sensor, since the transmission device and the reception device are formed on the same substrate, the dimensions of the sensor is minimized, and further, the manufacturing cost of the sensor is reduced. Further, since the positional relationship between the transmission device and the reception device is accurately defined on the substrate, the detection accuracy of the sensor is not substantially influenced by the attachment factor such as attachment error even when the sensor is mounted on an automotive vehicle. Further, since the sensor includes two different types of the sensors, the obstacle sensor securely detects the obstacle, and detects the obstacle in a wider range. Thus, the sensor has a small size, a wide detection range, and a low manufacturing cost.

Alternatively, the detection element may be disposed on the substrate of the supersonic sensor. In this case, the supersonic sensor and the detection element are provided by one-chip.

Alternatively, the reception device may include at least three reception elements. In this case, even when one of the reception elements is broken or has a difficulty, other reception elements can detect the obstacle so that function error is detected by the sensor. Further, the reception device may include four reception elements. In this case, the sensor has not only the function error detection but also fail safe function.

Alternatively, the transmission device may transmit multiple supersonic waves, each of which has a different frequency. In this case, the sensor has humidity compensation function, so that detection accuracy of the sensor caused by humidity change is compensated. Further, the transmission device may include multiple transmission elements, each of which corresponds to the different frequency, respectively. Furthermore, the transmission device may include two transmission elements. In these cases, the humidity compensation function of the sensor is easily obtained.

Alternatively, the substrate may include multiple membranes, each of which corresponds to the transmission device or the reception device, and each of the transmission device and the reception device may be disposed on the membrane, respectively. In this case, the membrane functions as a vibration surface. Further, each of the transmission device and the reception device may be a piezo-electric vibrator having a predetermined resonant frequency in a supersonic frequency range, and the piezo-electric vibrator together with the membrane may resonate at the predetermined resonant frequency. Furthermore, the detection element may include at least a part, which is disposed on the membrane. In this case, the dimensions of the sensor are much reduced. The supersonic sensor and the detection element may be formed on the same side of the membrane, or formed on different sides, respectively.

Alternatively, the detection element may be an image sensor including multiple optical detection elements and a lens. The optical detection elements are arranged to be a predetermined two dimensional pattern so that each optical detection element provides a picture cell. Each optical detection element is capable of generating an electric signal corresponding to an intensity of a light, which is entered into the optical detection element. The lens introduces the light into the optical detection element, the light entered into the lens with a predetermined angle range. In this case, a short detection range with wide angle is detected by the supersonic sensor, and a long detection range is detected by the image sensor. Thus, the sensor has wide and long detection range. Further, the case may include an opening, and the lens may be connected to the case in such a manner that the lens covers the opening of the case.

Alternatively, the detection element may include an infrared light sensor for detecting an infrared light emitted from the obstacle. In this case, a short detection range with wide angle is detected by the supersonic sensor, and a long detection range is detected by the infrared light sensor. Thus, the sensor has wide and long detection range. Further, the infrared light sensor and the supersonic sensor can be used at night. Further, the infrared light sensor may include an infrared light detection element and an infrared light absorption film. The infrared light detection element generates an electric signal on the basis of a temperature change when the infrared light detection element receives the infrared light, and the infrared light absorption film covers at least a part of the infrared light detection element. In this case, when the infrared light detection element and the infrared light absorption film are formed on the same substrate, the dimensions of the sensor are reduced. Further, when the infrared light detection element and the infrared light absorption film are formed on the membrane, the dimensions of the sensor are much reduced. Further, the detection element may further include an infrared light source for emitting the infrared light by heating a resistor in the infrared light source. In this case, the infrared light emitted from the infrared light source is reflected by the obstacle, and then, the reflected infrared light is detected by the infrared light detection element. Thus, the obstacle is detected by the sensor.

Alternatively, the detection element may include a millimeter wave generator and a millimeter wave detector. The millimeter wave generator generates a transmission wave. The transmission wave is reflected by the obstacle so that a reflection wave is generated. The millimeter wave detector detects the reflection wave, and generates an electric signal corresponding to an intensity of the reflection wave. In this case, a short detection range with wide angle is detected by the supersonic sensor, and a long detection range is detected by the detection element. Thus, the sensor has wide and long detection range.

Alternatively, the detection element may include a laser generator and a laser detector. The laser generator generates a transmission wave. The transmission wave is reflected by the obstacle so that a reflection wave is generated. The laser detector detects the reflection wave, and generates an electric signal corresponding to an intensity of the reflection wave. In this case, a short detection range with wide angle is detected by the supersonic sensor, and a long detection range is detected by the detection element. Thus, the sensor has wide and long detection range.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An obstacle sensor for detecting an obstacle comprising:
   a supersonic sensor for detecting the obstacle in a first range, wherein the supersonic sensor includes a semiconductor substrate, a transmission device for transmitting a supersonic wave by converting an electric signal, and a reception device for receiving the supersonic wave and for converting the supersonic wave to an electric signal, and wherein the transmission device and the reception device are disposed on the substrate;
   a detection element for detecting the obstacle in a second range; and
   a case, wherein
   the reception device includes multiple reception elements,
   at least a part of the first range of the supersonic sensor is different from the second range of the detection element,
   the supersonic sensor and the detection element are disposed in the case, and
   the detection element is disposed on the substrate of the supersonic sensor.

2. The obstacle sensor according to claim 1, wherein the reception device includes at least three reception elements.

3. The obstacle sensor according to claim 2, wherein the reception device includes four reception elements.

4. The obstacle sensor according to claim 1, wherein the transmission device transmits multiple supersonic waves, each of which has a different frequency, so that the supersonic sensor has a humidity correction capability.

5. The obstacle sensor according to claim 4, wherein the transmission device includes multiple transmission elements, each of which corresponds to the different frequency, respectively.

6. The obstacle sensor according to claim 5, wherein the transmission device includes two transmission elements.

7. The obstacle sensor according to claim 1, wherein
   the substrate includes multiple membranes, each of which corresponds to the transmission device or the reception device, and
   each of the transmission device and the reception device is disposed on the membrane, respectively.

8. The obstacle sensor according to claim 7, wherein
   each of the transmission device and the reception device is a piezo-electric vibrator having a predetermined resonant frequency in a supersonic frequency range, and
   the piezo-electric vibrator together with the membrane resonates at the predetermined resonant frequency.

9. The obstacle sensor according to claim 7, wherein the detection element includes at least a part, which is disposed on the membrane.

10. The obstacle sensor according to claim 1, wherein
    the detection element is an image sensor including multiple optical detection elements and a lens,
    the optical detection elements are arranged to be a predetermined two dimensional pattern so that each optical detection element provides a picture cell,
    each optical detection element is capable of generating an electric signal corresponding to an intensity of a light, which is entered into the optical detection element, and
    the lens introduces the light into the optical detection element, the light entered into the lens with a predetermined angle range.

11. The obstacle sensor according to claim 10, wherein
    the case includes an opening, and
    the lens is connected to the case in such a manner that the lens covers the opening of the case.

12. The obstacle sensor according to claim 1, wherein the detection element includes an infrared light sensor for detecting an infrared light emitted from the obstacle.

13. The obstacle sensor according to claim 12, wherein
    the infrared light sensor includes an infrared light detection element and an infrared light absorption film,
    the infrared light detection element generates an electric signal on the basis of a temperature change when the infrared light detection element receives the infrared light, and
    the infrared light absorption film covers at least a part of the infrared light detection element.

14. The obstacle sensor according to claim 12, wherein the detection element further includes an infrared light source for emitting the infrared light by heating a resistor in the infrared light source.

15. The obstacle sensor according to claim 1, wherein
    the detection element includes a millimeter wave generator and a millimeter wave detector,
    the millimeter wave generator generates a transmission wave,
    the transmission wave is reflected by the obstacle so that a reflection wave is generated, and
    the millimeter wave detector detects the reflection wave, and generates an electric signal corresponding to an intensity of the reflection wave.

16. The obstacle sensor according to claim 1, wherein
    the detection element includes a laser generator and a laser detector,
    the laser generator generates a transmission wave,
    the transmission wave is reflected by the obstacle so that a reflection wave is generated, and
    the laser detector detects the reflection wave, and generates an electric signal corresponding to an intensity of the reflection wave.

17. The obstacle sensor according to claim 1, wherein
    the first range of the of the supersonic sensor is disposed near the supersonic sensor, and
    the second range of the detection element is disposed far from the detection element.

* * * * *